(12) United States Patent
Schmidt

(10) Patent No.: US 11,383,598 B2
(45) Date of Patent: Jul. 12, 2022

(54) GROUND DRILLING DEVICE, USE OF A GROUND DRILLING DEVICE AND METHOD FOR THE MOVEMENT OF A GROUND DRILLING DEVICE

(71) Applicant: Custom Made Rigs GmbH, Lennestadt (DE)

(72) Inventor: Joachim Schmidt, Lennestadt (DE)

(73) Assignee: Custom Made Rigs GmbH, Lennestadt (DE)

( * ) Notice: Subject to any disclaimer, the term of this patent is extended or adjusted under 35 U.S.C. 154(b) by 336 days.

(21) Appl. No.: 16/688,559

(22) Filed: Nov. 19, 2019

(65) Prior Publication Data
US 2020/0164740 A1  May 28, 2020

(30) Foreign Application Priority Data
Nov. 22, 2018 (DE) .................. 102018009170.9

(51) Int. Cl.
| | | |
|---|---|---|
| *B60K 17/34* | (2006.01) | |
| *E21B 7/02* | (2006.01) | |
| *B60K 17/10* | (2006.01) | |
| *B60K 1/00* | (2006.01) | |
| *B60K 5/00* | (2006.01) | |
| *E21B 7/04* | (2006.01) | |

(52) U.S. Cl.
CPC .............. *B60K 17/34* (2013.01); *E21B 7/02* (2013.01); *B60K 1/00* (2013.01); *B60K 5/00* (2013.01); *B60K 17/10* (2013.01); *E21B 7/046* (2013.01)

(58) Field of Classification Search
CPC .. E21B 7/02; B60K 17/34; B60K 1/00; B60K 5/00; B60K 17/10
See application file for complete search history.

(56) References Cited

U.S. PATENT DOCUMENTS

| | | | | |
|---|---|---|---|---|
| 2,418,601 A | | 4/1947 | Richards | |
| 3,563,320 A | * | 2/1971 | VonRuden | E21B 7/022 173/27 |
| 3,815,689 A | | 6/1974 | Kuhl | |
| 3,823,902 A | * | 7/1974 | Bumueller | B62D 53/02 248/647 |
| 3,917,005 A | * | 11/1975 | Cannon | E21B 7/024 173/189 |
| 4,050,526 A | * | 9/1977 | Deike | E02D 7/10 173/27 |
| 4,068,728 A | * | 1/1978 | Subrick | B25D 9/12 173/27 |
| 4,303,130 A | * | 12/1981 | Bonca | E21B 3/02 173/189 |
| 5,033,554 A | * | 7/1991 | Younes | E21B 7/26 175/19 |
| 5,117,920 A | * | 6/1992 | Soble | E21B 7/02 173/126 |
| 5,125,460 A | * | 6/1992 | Behrens | E21B 7/046 173/184 |

(Continued)

*Primary Examiner* — Minnah L Seoh
*Assistant Examiner* — Michael R Stabley
(74) *Attorney, Agent, or Firm* — Howard IP Law Group, PC

(57) ABSTRACT

A ground drilling device with a wheel undercarriage, comprising wheels and wheel carriers for the wheels, wherein the wheel undercarriage makes possible a towing of the ground drilling device in highway traffic by a towing vehicle, and no tracked undercarriage is present.

18 Claims, 1 Drawing Sheet

(56) References Cited

U.S. PATENT DOCUMENTS

| | | | | |
|---|---|---|---|---|
| 5,363,925 | A | * | 11/1994 | Gallagher ............... E21B 7/027 173/185 |
| 5,470,131 | A | * | 11/1995 | Nolan ................... E01C 23/094 299/41.1 |
| 5,540,292 | A | * | 7/1996 | Behrens .................... E21B 7/02 173/184 |
| 5,570,975 | A | * | 11/1996 | Reinert, Sr. ............... E02D 7/26 173/184 |
| 5,647,442 | A | * | 7/1997 | Lange .................... E21B 7/022 173/184 |
| 5,954,143 | A | | 9/1999 | McCabe et al. |
| 7,036,606 | B2 | * | 5/2006 | Rossi ....................... E21B 3/02 172/25 |
| 7,721,825 | B2 | * | 5/2010 | Gobright, IV ......... B28D 1/041 175/57 |
| 9,527,140 | B2 | * | 12/2016 | Kern ...................... B23B 39/14 |
| 10,787,861 | B2 | * | 9/2020 | Jones ..................... E21B 7/028 |
| 2017/0259859 | A1 | | 9/2017 | Gilbert |
| 2018/0093706 | A1 | | 4/2018 | Nguyen et al. |

\* cited by examiner

GROUND DRILLING DEVICE, USE OF A GROUND DRILLING DEVICE AND METHOD FOR THE MOVEMENT OF A GROUND DRILLING DEVICE

FIELD OF INVENTION

The invention relates to a ground drilling device, a use of a ground drilling device and a method for moving a ground drilling device.

BACKGROUND

It is known how to transport ground drilling devices on special trailers, which can be hauled by a towing vehicle over public and usually paved roads. The transporting can occur at relatively high speed, at least to the vicinity of the application site. The ground drilling device can then be driven off from the special trailer by means of its own traction drive, which is usually a tracked undercarriage, and moved to its actual usage site. This usage site is often only reachable by impassable terrain. The majority of the tracked undercarriages used are well suited to such travel over impassable terrain, but they are in no way suitable for rapid transport for longer distances, such as transport on public traffic arteries.

SUMMARY

US 2017/0259859 A1 discloses the transporting of mobile industrial equipment, such as screening machines, conveyor layouts or rock crushing layouts, by truck on the highway, the mobile industrial equipment being suited to a coupling with the truck. The mobile industrial equipment comprises both a tracked undercarriage and wheels, and for the highway transport of the mobile industrial equipment the tracked undercarriage is brought into a position which allows the wheels of the mobile industrial equipment to make contact with the ground. For the movement of the mobile industrial equipment over impassable terrain, for example, the tracked undercarriage is brought into a position which places the wheels at a distance from the ground, so that the mobile industrial equipment can be moved by means of the tracked undercarriage located on the ground.

A first major drawback of the aforementioned ground drilling device, especially in the case of the larger ground drilling devices, is the heavy transport weight of the combination of trailer and ground drilling device. For example, a ground drilling device (horizontal drilling apparatus) with around 300 kN of shear and/or tensile force already weighs more than 22 tons. Added to this is a trailer weight of around 8 tons, so that the result is a trailer load of around 30 tons. In many countries, this means that costly and cumbersome special transports are needed, or the transporting of a ground drilling device in the assembled state is not even possible, so that such ground drilling devices need to be partly dismantled from the transport and then be mounted once again after the transport.

It is likewise a major drawback when, as is disclosed for example in US 2017/0259859 A1, a mobile industrial equipment comprises both a tracked undercarriage (for the transport in impassable terrain) and wheels (for highway transport): this results in a much higher weight, but also significantly higher production costs for the overall layout.

Now, the problem which the invention proposes to solve is to enable an easy movement of a ground drilling device in order to satisfy as much as possible the requirements both in highway transport and the circumstances at the intended site for the earth borehole being made and to mitigate the aforementioned drawbacks of the prior art.

The problem is solved by the subject matter of the independent claims. Advantageous embodiments are the subject matter of the respective dependent claims and the specification.

The invention starts from the basic notion that the movement of a ground drilling device having only a wheel undercarriage is improved in that the wheel undercarriage, comprising wheels and wheel carriers for the wheels, is used both in highway traffic and the ground drilling device can be pulled by means of a towing vehicle and the same wheel undercarriage is used in the area of the earth borehole being made without the towing vehicle in order to move the ground drilling device. The inventors have for the first time broken with the prejudice against using a wheel undercarriage provided on the ground drilling device both for the movement of the ground drilling device in highway traffic and for the movement of the ground drilling device at the earth borehole being made. In the prior art, the prejudice existed of making a separation of the undercarriages and/or of transporting the ground drilling device in highway traffic on a trailer, from which the ground drilling device was removed in the area of the earth borehole being made and was moved on another undercarriage. It was a firm belief of the person skilled in the art that only in this way could the different requirements be met.

The invention creates a ground drilling device with a wheel undercarriage, comprising wheels and wheel carriers for the wheels. The wheel undercarriage makes possible a towing of the ground drilling device in highway traffic by a towing vehicle with a minimum speed of 25 km/h, and no tracked undercarriage is present.

A "ground drilling device" in the sense of the specification is any given device which moves a drill string, especially one having rod sections, in an existing or yet to be created passage in the ground, in order to create or expand a borehole, especially a horizontal drilling (HD), or to lay pipelines or other long bodies in the ground. The ground drilling device in particular may be a HD device. A ground drilling device may thus be a device driving a drill string working by soil displacement and introducing the drill string into the ground by rotation and/or translation in the longitudinally axial direction of the drill string. A borehole can be introduced into the ground by tension or compression applied to the drill string.

The term "HD" (horizontal drilling) in the sense of the present specification encompasses in particular a borehole or passage or pipeline situated horizontally for at least a portion.

The term "ground" in the sense of the present specification encompasses in particular every kind of existing or yet to be created passages or boreholes in a body, preferably being horizontal at least for a portion, especially ground passages, especially earth boreholes, rock boreholes, or earth conduits, as well as underground or aboveground pipelines and water canals which can be produced or laid by using a corresponding ground drilling device.

The term "drill string" in the sense of the specification encompasses any given means of being introduced into the ground in order to make a borehole in the ground. The drill string may comprise rods, a chain, and/or a cable. The term "rods" encompasses in the sense of the specification not solely rigid rods comprising individual directly or indirectly joined rod sections.

The term "undercarriage" in the sense of the specification encompasses the parts of a land vehicle which serve for the connecting of the chassis or vehicle body to the ground by way of the wheels. The wheels thus form the contact between undercarriage and ground. The "wheel" in the sense of the specification may encompass the entire body, comprising in particular a rim and a tire. The wheel, i.e., the rim and tire, may comply in particular with the instructions of the particular highway traffic ordinances of the respective country in which the ground drilling device is being used.

The term "wheel suspension" in the sense of the specification encompasses all components for the movable connection between the wheels and the chassis, comprising the load-bearing parts whose function is to carry the drive, the chassis, the body and the like and to stabilize them against external force effects.

The term "wheel carrier" in the sense of the specification encompasses any given configuration of the portion of the wheel suspension which can hold a wheel hub and thus the wheel. A wheel carrier in the sense of the specification may comprise an axle or a stub axle, which can be inserted into the wheel hub. The axles may have both hydraulic and pneumatic suspension. In this way, a good traction is assured even on uneven terrain.

A "towing vehicle" in the sense of the specification may be any given vehicle driven under its own power. A towing vehicle in the sense of the specification may be a truck, a passenger car, or any other self-propelled agricultural vehicle which can move on the highway.

A "regular towing" is possible, by which the wheel undercarriage can reach a speed corresponding to the usual speed for the towing machine. In particular, the wheel undercarriage during the regular towing can follow a direction dictated by the towing machine.

Insofar as an axle is mentioned in the specification, this is taken to mean that two or more wheels are arranged on the undercarriage by means of wheel suspensions such that these are substantially arranged on a line running transversely to the direction of travel and substantially horizontal to the ground. In a preferred embodiment, the wheels are steerable. In this way, the ground drilling device can follow the driving direction of a towing vehicle or also dictate and/or change the direction of travel of the ground drilling device independently of the towing vehicle.

In one preferred embodiment, the wheels have a diameter of at least 15 cm, preferably at least 20 cm, especially preferably 25 cm, most especially preferably at least 30 cm, most especially particularly preferably 35 cm. In particular, the tires may be suitable for a resulting tire load. In particular, the tires may be designed for a minimum speed of 50 km/h, preferably one of 60 km/h, especially preferably one of 70 km/h, most especially preferably one of 80 km/h, especially particularly preferably one of 90 km/h and especially most particularly preferably one of 100 km/h. The tire tread may be designed in particular such that it is suitable both for a paved surface and an unpaved surface.

In one preferred embodiment, the rim of a wheel has a minimum size of R 22.5. In this way, hydraulic motors of a ground drilling device can be supported. One possible tire may be an Alliance 380; 600/50 R 22.5, especially with offroad tread and especially designed for 100 km/h.

In one preferred embodiment, a tire pressure regulating system may be present, by means of which the ground pressure of the tire or tires or the wheel or wheels on an unpaved surface can be reduced. At low speed, the bearing surface can be significantly increased.

In one preferred embodiment, the undercarriage comprises more than one steerable axle, whereby the term "steerable axle" can be taken to mean that for example one wheel or two wheels or even several wheels can be arranged freely rotatable or drivable on wheel carriers, such as an axle or shaft, being arranged substantially orthogonally to the direction of travel and arranged substantially horizontally, wherein these wheel carriers in turn can be arranged individually rotatable about their substantially vertical axes, or on the other hand one or more wheels can be mounted on an axle and then the entire axle can be mounted rotatable about a substantially vertical axis.

The wheels may be fastened to rigid axles and/or to single-wheel suspensions (swingarms).

In one preferred embodiment, the undercarriage of the ground drilling device may also comprise more than one steerable axle. In this way, the ground drilling device with the undercarriage can be very agile in design and thus be able to maneuver even in tight conditions.

In one preferred embodiment, an all-wheel steering is present, which is designed in particular as a dog steering (all the wheels are turned in the same direction). This can reduce the ground pressure during offroad travel. It may be provided in particular that in the case of an all-wheel steering at least two axles, especially the two axles which are the furthest apart in the longitudinal direction, can be steered in opposite directions.

In one especially preferred embodiment, the wheel undercarriage has two axles. More than two axles may be provided.

In a two-axle design, either the first axle in the direction of travel and the second axle in the direction of travel may serve as the steering axle. A dog steering is possible for a two-axle design (all the wheels are steered in the same direction). The two axles in a two-axle design may also be steered in opposite directions.

In a three-axle design, the two first axles in the direction of travel (the first and second axle) may be steered in the same direction and the third axle may be unsteered. It is possible in a three-axle design for the first and third axle to be steered in the opposite direction and the second axle to be designed as an unsteered axle. Moreover, it is possible in a three-axle design for the first axle to be unsteered and the second and third axle can be steered in the same direction.

In one preferred embodiment, a hydraulic or electronic differential lock (similar to an ASR or antiskid control of a passenger car) is possible. In this way, a spinning of one or more wheels on loose or unpaved ground can be prevented.

In one preferred embodiment, the undercarriage of the ground drilling device may be provided with an all-wheel drive. Such an all-wheel drive can make it possible for the ground drilling device with the undercarriage to maneuver as well in extremely impassable terrain.

In one preferred embodiment, the all-wheel drive can provide an individual drive for each wheel of the undercarriage of the ground drilling device. For straight travel, all the wheels can be driven at the same speed, provided that the wheels have the same outer or rolling diameter. An undercarriage of the ground drilling device may also be equipped with wheels of different outer or rolling diameter. For straight travel of an undercarriage of a ground drilling device, the speeds of the individual wheels of the undercarriage can be adapted accordingly.

In one preferred embodiment, the all-wheel drive may be designed so that the speeds of the wheels of the all-wheel drive can be adjusted individually for each of the wheels in order to travel on a curve. For this, for a lefthand turn for example, the wheels on the left side of the undercarriage of the ground drilling device, looking in the direction of travel, can be driven with lower speed than the right wheels of the undercarriage of the ground drilling device, looking in the direction of travel. Thus, the right wheels will cover a greater distance than the left wheels, so that a lefthand turn can be executed. For a righthand turn, the right wheels can be driven accordingly with lesser speed than the left wheels. For better maneuverability of such an undercarriage of a ground drilling device, each time only the wheels of the undercarriage of the ground drilling device on one side can be driven, while the wheels on the other side can be braked or not even driven at all. Thus, a righthand or lefthand turn of the undercarriage of the ground drilling device can occur. For better maneuverability, the right and left wheels of the undercarriage of a ground drilling device can each be driven in opposite direction. Thus, for example, an undercarriage of a ground drilling device can also be rotated in place.

In one preferred embodiment, the ground drilling device may comprise a device making it possible to enable or disable the independent steerability of the one or also the independent steerability of several steerable axles or also the independent steerability of an all-wheel drive. For example, if the independent steerability is disabled, the undercarriage of a ground drilling device can follow a towing vehicle without performing its own steering movements. For the self-driving operation, for example in impassable terrain in order to reach the site of usage, the independent steerability of the undercarriage of the ground drilling device can be enabled. Thus, the ground drilling device can perform its own steering movements, such as changes in the direction of travel.

In one preferred embodiment, the undercarriage is functionally connected to a drive for at least one wheel. In this way, at least one wheel of the undercarriage can be driven for the self-driving operation. In one preferred embodiment, the drive comprises a combustion engine. Alternatively or additionally, the drive may comprise a hydraulic motor. Moreover, it is possible for the drive to comprise additionally or alternatively an electric motor. Each of the mentioned drives, i.e., the combustion engine, the hydraulic motor and the electric motor, may be combined with one or more of the other drives, so that a "hybrid drive" is possible. A combustion engine affords the advantage of using a known drive technology, in which the energy source is easy to replenish, for example, without placing special requirements on the charging of a battery or an accumulator for an electric motor. An electric motor can be used for a protracted pollutant burden in the area of the ground drilling device.

In one preferred embodiment, the drive for at least one wheel may be, at least partially, the drilling drive of the ground drilling device, so that basically no additional unit needs to be provided and weight and expense can be reduced.

In one preferred embodiment, the undercarriage comprises a receptacle for various ground drilling devices, in order to provide a modular design. A receptacle may provide fastening points which can have the same design for different ground drilling devices. The ground drilling device may be connected by means of screws, bolts, or the like to the undercarriage. In this way, it is possible to transport different ground drilling devices with only a single wheel undercarriage.

In one preferred embodiment, the ground drilling device comprises a coupling for coupling to a towing vehicle. In the sense of the specification, the term "coupling" means an element of a pair for the mechanical coupling. The coupling may be designed as a coupling hook, which can interact with another coupling hook in order to produce a mechanical coupling. The two coupling hooks may be opened in the same direction. In an especially preferred embodiment, the coupling on the ground drilling device is designed as a drawbar eye. As the mating piece, a bar coupling may be provided on the towing vehicle. But it may also be provided that a fifth wheel plate or a kingpin is provided on the ground drilling device; in such a case, a kingpin or a fifth wheel plate can then be formed on the towing vehicle.

The invention also creates a use of a ground drilling device, which may be designed in particular as explained above. A wheel undercarriage having wheels and wheel carriers is used both in highway traffic and off road at the earth borehole for the moving of the ground drilling device.

The invention also creates a method for the moving of a ground drilling device, which may be designed in particular as explained above. The method involves the following steps: providing of a wheel undercarriage with wheels and wheel carriers on the ground drilling device; using the wheel undercarriage for transporting of the ground drilling device in highway traffic and using the wheel undercarriage for moving the ground drilling device without the towing machine, especially in the vicinity of the earth borehole being produced away from highway traffic.

The preceding remarks as well as the following specification of exemplary embodiments do not constitute a renouncing of particular embodiments or features.

BRIEF DESCRIPTION OF THE DRAWINGS

The invention shall be explained more closely in the following with the aid of an exemplary embodiment represented in the drawings.

The drawings show.

DETAILED DESCRIPTION

Figure 1:
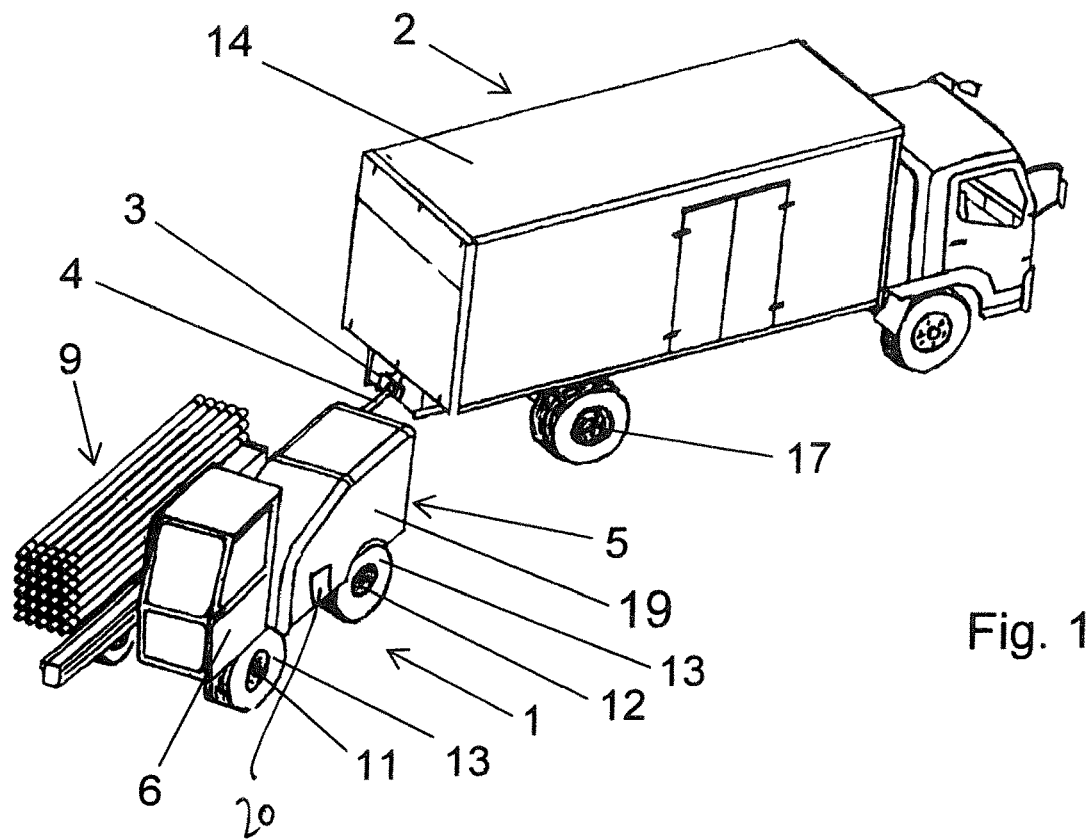
FIG. 1 a ground drilling device hauled by a towing vehicle.

FIG. 1 shows a ground drilling device 1 which is coupled by means of a coupling 4 as part of a mechanical connection pair, in this case a drawbar eye and a bar coupling 3 of a towing vehicle 2, to the towing vehicle 2. In a body 14 of the towing vehicle 2 there are carried along the accessories (not shown), such as a drill fluid mixing layout, drill heads and tools for the ground drilling device 1. The ground drilling device 1 comprises a drilling drive 5 to carry out the ground drilling, with which it can be operated autonomously. Furthermore, the ground drilling device 1 comprises an undercarriage 15 with a rigid axle 11 and a steerable axle 12. The steerable axle 12 is disabled for operation on paved or public roads, so that it is steered by the towing vehicle 2 in a predetermined direction, such as a curve in the road, and thus the ground drilling device 1 can follow the towing vehicle 2 on these roads.

Wheels 13 of the two axles 11, 12 are disabled for the highway operation so that they can follow the towing vehicle 2 without being driven. The driving forces required under these conditions for the transport of the ground drilling device 1 are transmitted by the towing vehicle 2 to the road via the rear axle 17. The road train consisting of the towing vehicle 2 and the ground drilling device 1 is thus transported with relatively high speed to the vicinity of a site of use.

Figure 2:
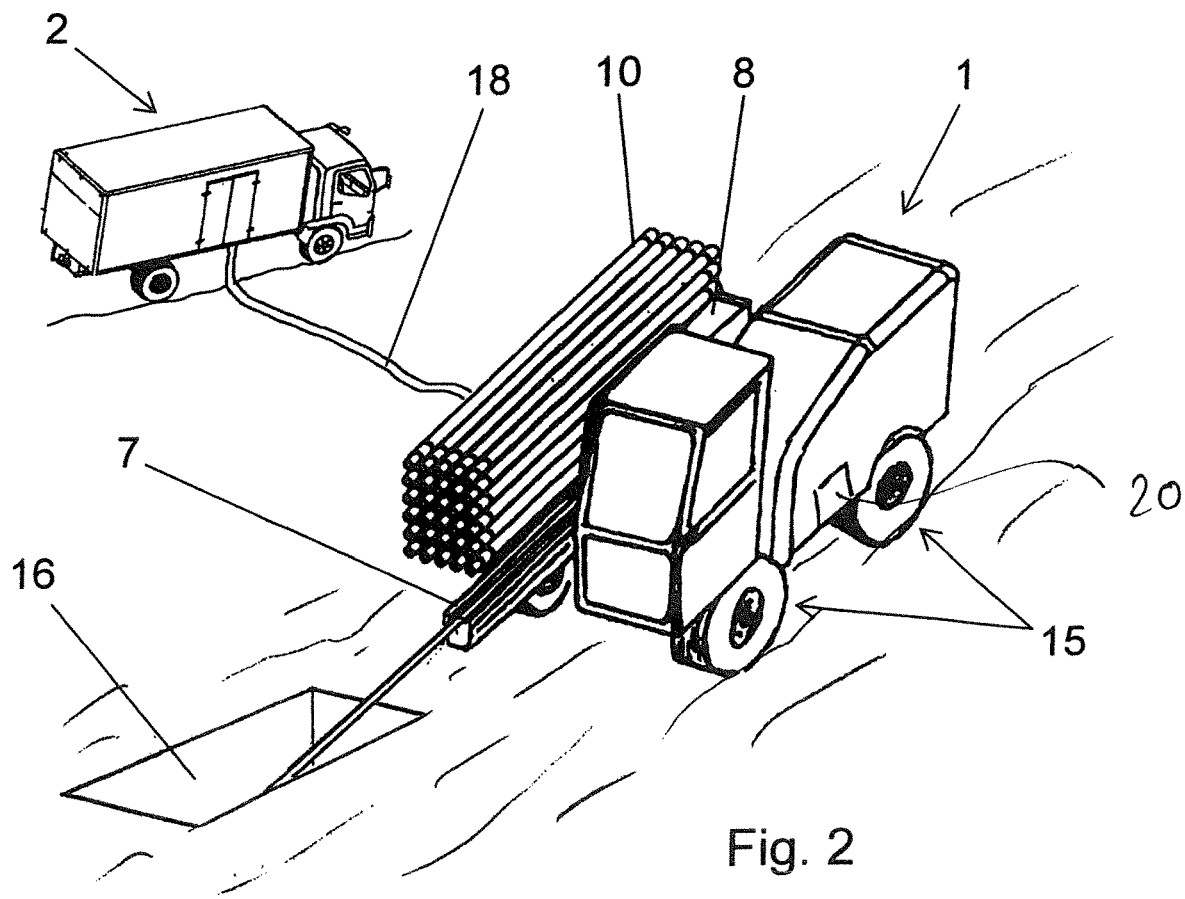
FIG. 2 the ground drilling device of FIG. 1 at the actual usage site, during use, uncoupled from the towing vehicle.

FIG. 2 shows the ground drilling device 1 at the actual site of use.

After the separating of the coupling 4 of the ground drilling device 1, designed as a drawbar eye, from the bar coupling 3 of the towing vehicle 2, the disabling of the steerable axle 12 and the wheels 13 of the axles 11, 12 is lifted. The ground drilling device 1 is now moved to the actual site of use at a starting pit 16 by a schematically drawn drive 20, which is located beneath a casing 19 of the drilling drive 5, by means of the so driven axle(s) 11 and 12 and the driven wheels 13 and oriented according to the drilling project by the equipment operator, who operates the ground drilling device 1 from the cabin 6. The drilling rods 10 are gradually advanced in the direction of a target pit (not shown) via a carriage 7, on which is mounted a drive sled 8 for the rotational and translatory driving of the drilling rods 10 stockpiled in a magazine 9. A supply line 18 runs from the body 14 of the towing vehicle 2 to the ground drilling device 1 in order to supply the ground drilling device 1 with drill fluid, which is prepared before the start and during the drilling process by a drill fluid mixing system in the body 14, not shown. After reaching the target pit, the conduit being laid (gas, water, sewage, electricity, data lines, etc.) is pulled in during the backward movement. After completion of this work, the ground drilling device 1 is either moved by its own drive 20 to another site of use located nearby, or the ground drilling device 1 is once more coupled by means of the coupling 4 of the ground drilling device 1, designed as a drawbar eye, to the bar coupling 3 of the towing vehicle 2. The steerable axle 12 and the wheels of the axles 11, 12 are once more disabled, as already explained above, so that the towing vehicle 2 can haul the ground drilling device 1 to another new and distant site of use.

The invention claimed is:

1. A ground drilling device with a wheel undercarriage, comprising wheels and wheel carriers for the wheels, wherein the wheel undercarriage is configured to enable towing of the ground drilling device in highway traffic by a towing vehicle, and wherein no tracked undercarriage is present;
   wherein the wheel undercarriage is functionally connected to a drive for at least one wheel; and
   wherein the drive for at least one wheel is at least partially a drilling drive of the ground drilling device.

2. A ground drilling device according to claim 1, wherein the wheels have a minimum wheel size of 15 cm in diameter.

3. A ground drilling device according to claim 1, wherein the wheels are steerable.

4. A ground drilling device according to claim 3, wherein an adjustment can be disabled for the steering-of the wheels.

5. A ground drilling device according to claim 1, wherein the wheel undercarriage comprises more than one-steerable axle.

6. A ground drilling device according to claim 1, wherein the wheel undercarriage comprises an all-wheel drive.

7. A ground drilling device according to claim 6, wherein the speed of the wheels of the all-wheel drive is individually adjustable in order to control the direction of travel of the ground drilling device.

8. A ground drilling device according to claim 1, wherein the drive comprises a combustion engine.

9. A ground drilling device according to claim 1, wherein the drive comprises a hydraulic motor.

10. A ground drilling device according to claim 1, wherein the drive comprises an electric motor.

11. A ground drilling device according to claim 1, wherein a receptacle is disposed on the wheel undercarriage for housing various ground drilling devices.

12. A ground drilling device according to claim 1, further comprising a coupling for connecting to a towing vehicle.

13. A method for moving a ground drilling device comprising:
    providing of a wheel undercarriage with wheels and wheel carriers on the ground drilling device wherein the wheel undercarriage is functionally connected to a drive for at least one wheel and the drive is also at least partially a drilling drive of the ground drilling device;
    using the wheel undercarriage for transporting of the ground drilling device while towing by means of a towing machine; and
    using the wheel undercarriage for moving the ground drilling device without the towing machine.

14. The method of claim 13, wherein the provided wheels are steerable.

15. The method of claim 14, wherein the provided steerable wheels are adjustable to disable steering of the wheels.

16. The method of claim 13, wherein the provided wheel undercarriage comprises more than one-steerable axle.

17. The method of claim 13, wherein the provided wheel undercarriage comprises an all-wheel drive.

18. The method of claim 17, wherein a speed of the wheels of the provided all-wheel drive wheel undercarriage are individually adjustable; and
    further comprising individually adjusting the speed of the wheels of the all-wheel drive wheel undercarriage to control the direction of travel of the ground drilling device.

* * * * *